United States Patent
Marko et al.

(10) Patent No.: US 8,275,005 B2
(45) Date of Patent: *Sep. 25, 2012

(54) METHOD AND APPARATUS FOR EMPLOYING STORED CONTENT AT RECEIVERS TO IMPROVE EFFICIENCY OF BROADCAST SYSTEM BANDWIDTH USE

(75) Inventors: Paul D. Marko, Pembroke Pines, FL (US); Craig P. Wadin, Sunrise, FL (US)

(73) Assignee: Sirius XM Radio Inc., New York, NY (US)

( * ) Notice: Subject to any disclaimer, the term of this patent is extended or adjusted under 35 U.S.C. 154(b) by 520 days.

This patent is subject to a terminal disclaimer.

(21) Appl. No.: 12/457,023

(22) Filed: May 29, 2009

(65) Prior Publication Data

US 2009/0268567 A1    Oct. 29, 2009

Related U.S. Application Data

(63) Continuation of application No. 11/553,398, filed on Oct. 26, 2006, now Pat. No. 7,555,020, which is a continuation of application No. 09/695,226, filed on Oct. 25, 2000, now Pat. No. 7,180,917.

(51) Int. Cl.
*H04J 3/04* (2006.01)
(52) U.S. Cl. .................... 370/535; 370/319; 725/89
(58) Field of Classification Search .............. None
See application file for complete search history.

(56) References Cited

U.S. PATENT DOCUMENTS

| | | | |
|---|---|---|---|
| 5,161,251 A | 11/1992 | Mankovitz | 455/66 |
| 5,339,239 A | 8/1994 | Manabe et al. | 364/401 |
| 5,406,626 A | 4/1995 | Ryan | 380/50 |
| 5,515,106 A | 5/1996 | Chaney et al. | 725/48 |
| 5,524,051 A | 6/1996 | Ryan | 380/9 |
| 5,526,284 A | 6/1996 | Mankovitz | 364/514 R |
| 5,539,635 A | 7/1996 | Larson, Jr. | 364/401 R |
| 5,572,442 A | 11/1996 | Schulhof et al. | 364/514 C |
| 5,590,195 A | 12/1996 | Ryan | 380/9 |
| 5,614,940 A | 3/1997 | Cobbley et al. | 348/7 |
| 5,732,324 A | 3/1998 | Rieger, III | 455/3.1 |
| 5,751,806 A | 5/1998 | Ryan | 380/9 |
| 5,809,144 A | 9/1998 | Sirbu et al. | 380/25 |
| 5,809,472 A | 9/1998 | Morrison | 704/500 |
| 5,815,671 A | 9/1998 | Morrison | 395/200.77 |
| 5,819,049 A | 10/1998 | Rietmann | 395/200.69 |
| 5,864,747 A | 1/1999 | Clark et al. | 725/67 |
| 5,886,995 A | 3/1999 | Arsenault et al. | 370/477 |
| 5,889,860 A | 3/1999 | Eller et al. | 380/4 |
| 5,914,941 A | 6/1999 | Janky | 370/313 |
| 5,991,374 A | 11/1999 | Hazenfield | 379/101.01 |
| 6,029,045 A | 2/2000 | Picco et al. | 725/34 |
| 6,199,076 B1 | 3/2001 | Logan et al. | |
| 6,266,813 B1 | 7/2001 | Ihara | 725/36 |
| 6,588,015 B1 | 7/2003 | Eyer et al. | 725/89 |
| 7,180,917 B1 | 2/2007 | Marko et al. | 370/535 |
| 7,509,178 B2 | 3/2009 | Logan et al. | |

*Primary Examiner* — Bob Phunkulh
(74) *Attorney, Agent, or Firm* — Roylance, Abrams, Berdo & Goodman, LLP

(57) ABSTRACT

The invention relates generally to a receiver unit in a digital broadcast system for receiving a broadcast signal comprising content segments and control data, and generating an output signal using the content segments and previously stored content segments. The previously stored content segments are retrieved from a local memory device using the control data and inserted among the received content segments.

8 Claims, 3 Drawing Sheets

METHOD AND APPARATUS FOR EMPLOYING STORED CONTENT AT RECEIVERS TO IMPROVE EFFICIENCY OF BROADCAST SYSTEM BANDWIDTH USE

This application is a continuation of U.S. application Ser. No. 11/553,398, filed Oct. 26, 2006, now U.S. Pat. No. 7,555,020 which is a continuation of U.S. patent application Ser. No. 09/695,226, Filed Oct. 25, 2000 (now issued as U.S. Pat. No. 7,180,917), the contents of both applications being incorporated herein by reference.

CROSS REFERENCE TO RELATED APPLICATIONS

Related subject matter is disclosed and claimed in co-owned U.S. Pat. Nos. 6,876,835, 6,834,156, 6,686,880 and 6,564,003; in co-pending U.S. patent application Ser. No. 09/695,228 filed by Paul D. Marko et al on Oct. 25, 2000; and in co-pending U.S. patent application Ser. No. 11/379,040, filed by Hien D. Ma et al on Apr. 17, 2006; all of said applications and patents being expressly incorporated herein by reference.

FIELD OF THE INVENTION

The invention relates generally to an apparatus and method for reducing the bandwidth used in a digital broadcast system to provide program content to a receiver unit.

BACKGROUND OF THE INVENTION

Satellite digital audio radio service (SDARS), a satellite broadcast service established by the U.S. Federal Communications Commission (FCC), has been proposed using satellite transmission of digital audio programs to radio receivers. The radio receivers can be stationary receivers (i.e., with a receiver antenna pointed for optimal line of sight (LOS) reception from a satellite) or mobile receivers (e.g., a receiver that is hand-carried by a user or is mounted in a vehicle).

The type of content which can be distributed in an SDARS system or a similar digital broadcast system typically includes audio programs such as music recordings, news programs and talk shows, among other programs, and advertisements. A digital broadcast also typically comprises dialogue segments from a broadcast channel host or other program host which occur between the audio programs and advertisements presented on a broadcast channel.

A significant amount of the content that is to be broadcast is predetermined prior to transmission such as popular songs. Radio stations, for example, frequently use play lists to determine how often a selected number of songs, which are identified as being most popular at a given point in time, are to be broadcast. Popular songs and other programs which can be repeated on a broadcast channel are in contrast to "live" commentary provided by a broadcast channel host, talk show host or other commentator, for example.

Since bandwidth in a digital broadcast system is limited and valuable, efficient use of the bandwidth is desirable. A need therefore exists for a digital broadcast system wherein content is provided in a broadcast signal in an optimal manner to use bandwidth as efficiently as possible.

SUMMARY OF THE INVENTION

The above described disadvantage is overcome and a number of advantages are realized by a digital broadcast system wherein receivers are provided with local storage devices for storing selected content (e.g., audio programs). The broadcast signal employed by the digital broadcast system comprises dialogue segments, content segment identifiers corresponding to content that has been previously stored at the local storage devices, and control data. The receivers are configured to receive the broadcast signal and to generate an output signal for playback via a loudspeaker, for example. The output signal is generated by accessing and retrieving from the local storage device those previously stored content segments identified in the broadcast signal. The retrieved segments are inserted in the output signal between the dialogue segments in accordance with the control data.

In accordance with another aspect of the present invention, the receivers are provided with a processing device and a multiplexing device operable to receive control signals generated by the processing device in response to the control data and content segment identifiers provided in the received broadcast signal. The multiplexing device then assembles the output signal using the live segments in the broadcast signal and by inserting the retrieved segments from the local storage device when instructed to do so via the processing device.

In accordance with yet another aspect of the present invention, the broadcast signal comprises progress information relating to the duration of the previously stored segments identified in the broadcast signal for insertion into an output signal by a receiver. The processing device is programmable to generate control signals in response to the progress information to establish timing for inserting selected, stored content segments into the output signal among the live broadcast segments.

In accordance with still yet another aspect of the present invention, the content segments stored in the local storage devices can be deleted or replaced with different segments (e.g., updated versions of stored segments), and new content segments added to the storage device, via different methods. For example, new content can be downloaded to the local storage device from a portable storage device, or transmitted to the local storage device via wireline or wireless communication link, as well as commands to the local storage device to delete or update previously stored segments.

In accordance with the present invention, an apparatus for generating an output signal from a broadcast signal in a digital broadcast system is provided which comprises (1) a memory device for storing predefined content segments; (2) a receiver for receiving the broadcast signal, the broadcast signal comprising content segments and control data provided among the content segments to indicate where the predefined content segments are to be inserted by the apparatus, the receiver being operable to extract the content segments and the control data from the broadcast signal; (3) an output device for playing back the output signal; (4) a processing device configured to receive the control data from the receiver and to generate a control signal used by the memory device to retrieve selected ones of the predefined content segments in accordance with the control data; and (5) a multiplexer configured to receive as inputs the control signal generated by the processing device, the content segments from the receiver and the selected predefined content segments. The multiplexer generates the output signal using the content segments received by the receiver and inserting the predefined content segments among the content segments in accordance with the control data.

BRIEF DESCRIPTION OF DRAWINGS

The various aspects, advantages and novel features of the present invention will be more readily comprehended from the following detailed description when read in conjunction with the appended drawings, in which.

Throughout the drawing figures, like reference numerals will be understood to refer to like parts and components.

DETAILED DESCRIPTION OF THE PREFERRED EMBODIMENTS

Figure 1:
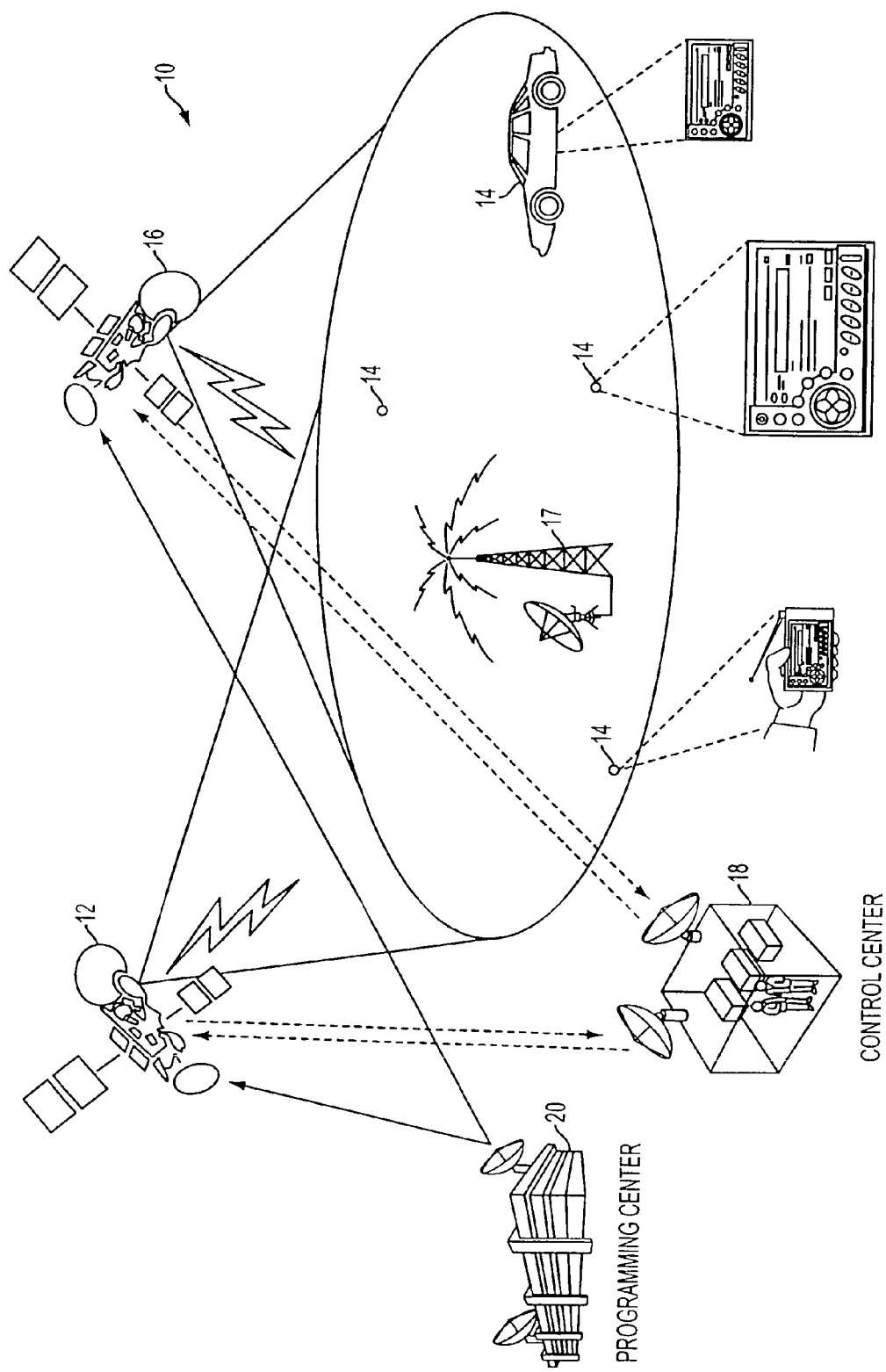
FIG. 1 illustrates an SDARS system constructed in accordance with an embodiment of the present invention.

FIG. 1 depicts a satellite broadcast system 10 which comprises at least one geostationary satellite 12, for example, for line of sight (LOS) satellite signal reception at receiver units indicated generally at 14. The satellite broadcast system 10 can be used for SDARS, for example. Another geostationary satellite 16 at a different orbital position is provided for diversity purposes. One or more terrestrial repeaters 17 can be provided to repeat satellite signals from one of the satellites in geographic areas where LOS reception is obscured by tall buildings, hills and other obstructions. It is to be understood that different numbers of satellites can be used, and satellites in other types of orbits can be used. Alternatively, a broadcast signals can be sent using only a terrestrial transmission system.

Figure 2:
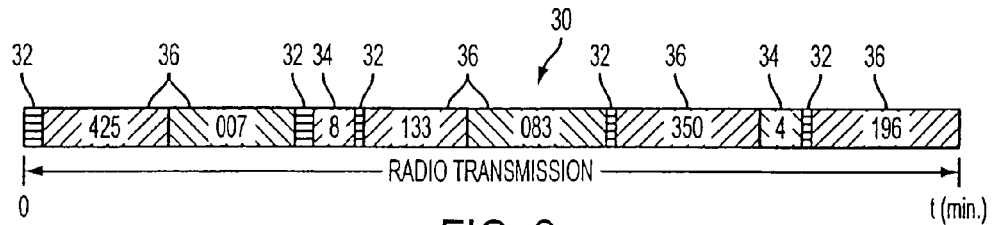
FIG. 2 illustrates an exemplary radio broadcast transmission.

As illustrated in FIG. 1, a receiver unit 14 can be configured for stationary use (e.g., on a subscriber's premises), or mobile use (e.g., portable use or mobile use in a vehicle), or both. A control center 18 is provided for telemetry, tracking and control of the satellites 12 and 16. A programming center 20 is provided to generate and transmit a composite data stream via the satellites 12 and 16 which comprises a plurality of payload channels. One of the payload channels 30 is depicted in FIG. 2 for illustrative purposes. The system 10 can broadcast a composite data stream generated, for example, by multiplexing a plurality of payload channels 30. The receivers are therefore configured to demultiplex a received composite data stream to playback a selected one of the payload channels.

The programming center 20 is configured to obtain content from different sources and providers which can comprise both analog and digital information such as audio, video, data, program label information, auxiliary information, and so on. For example, the programming center 20 can provide SDARS having on the order of 100 different program channels to transmit different types of music programs (e.g., jazz, classical, rock, religious, country, and so on) and news programs (e.g., regional, national, political, financial and sports). The SDARS can also provide emergency information, travel advisory information, educational programs, and the like.

The types of content to be provided in a payload channel is determined manually or automatically via a computer, based on contractual and financial arrangements with information providers, and demographic and financial decisions determining the types of programming to be provided via the programming center 20. In addition, a payload channel 30 can comprise plural service components to provide a plurality of different services. For example, a number of service components in a payload channel can be related to the same service and can include an audio component and a video and/or a digital data stream comprising auxiliary information, or another audio component to insert advertising information relating to the audio or video program.

With continued reference to FIG. 2, an exemplary payload channel 30 is shown which provides a radio broadcast transmission to the receivers 14. The radio broadcast transmission comprises a number of content segments corresponding to live talk 32 by a program channel host (e.g., disc jockey), prerecorded commercials 34 and prerecorded musical selections 36. In accordance with the present invention, receivers 14 are configured to access and playback locally stored content segments such as prerecorded commercials 34 and musical selections 36 to reduce the amount of bandwidth required for a radio broadcast transmission, for example. The locally stored content segments can include prerecorded music selections, advertisements, news programs, and the like.

Figure 3A:
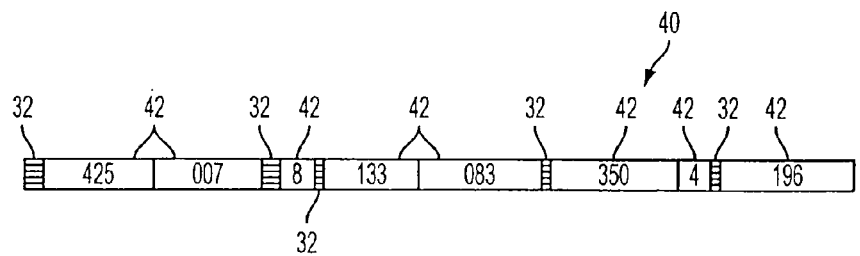
FIGS. 3A, 3B and 3C illustrate, respectively, an exemplary radio broadcast transmission, stored content, and a receiver output signal generated in accordance with an embodiment of the present invention.
Figure 3B:
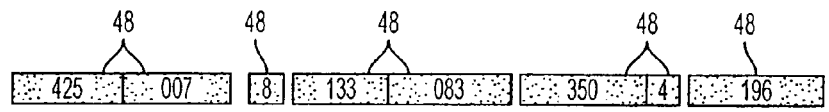
Figure 3C:
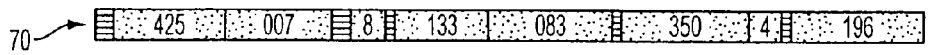

With reference to FIG. 3A, a payload channel 40 is generated via the programming center 20 to transmit live talk segments 32 and data 42 which provides instructions to receivers 14 to playback selected ones of locally stored content segments. The data 42 preferably comprises identifiers for locally stored content segments and progress data. When generating an output signal from the received payload channel 40, a receiver 14 uses the identifiers (e.g., "425", "007", "8", and so on) to access and retrieve corresponding content segments from a local storage device, as indicated in FIG. 3B. The receiver 14 uses the progress data to determine when to playback the retrieved content segments with respect to the broadcast live content segments 32 in the payload channel 40. For example, the progress data can indicate the current time index in a content segment at a particular point in time during the transmission and playback of a payload channel. Accordingly, the progress data facilitates the generation of an output signal from the received payload channel 40 which is perceived by users as being a continuous composite data stream that was broadcast with retrieved content segments therein, as indicated in FIG. 3C.

Figure 4A:
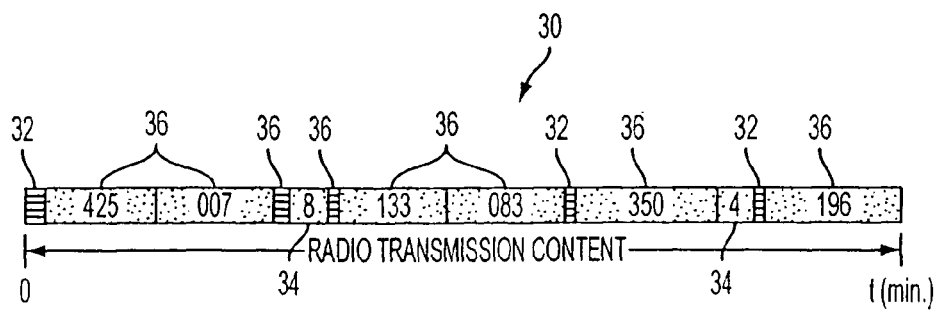
FIGS. 4A, 4B, 4C and 4D relative instantaneous bandwidth requirements for an exemplary broadcast transmission and a broadcast transmission generated in accordance with the present invention.
Figure 4B:
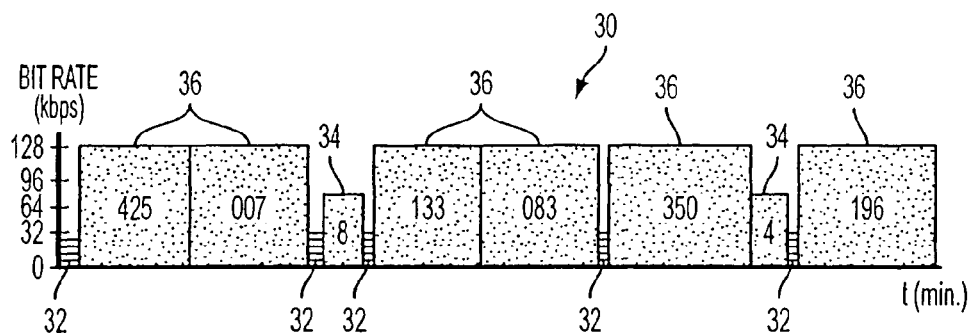
Figure 4C:
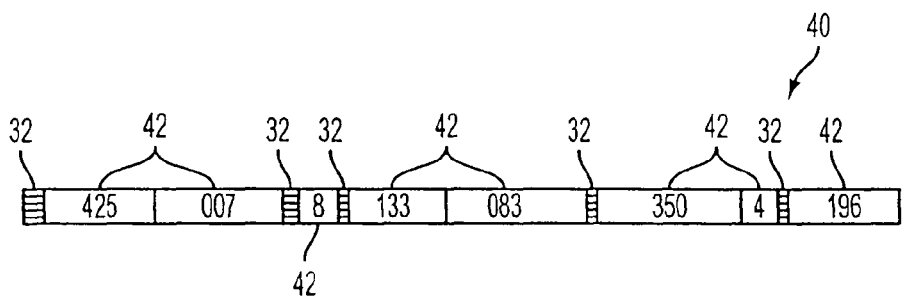
Figure 4D:
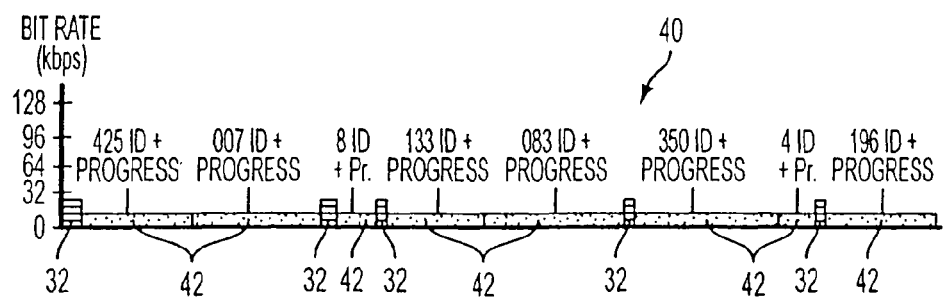

The advantages of the present invention will now be discussed with reference to FIGS. 4A through 4D. FIGS. 4B and 4D contrast the instantaneous bandwidth requirements over time of the payload channels 30 and 40, respectively, in FIGS. 4A and 4C. As stated previously in connection with FIG. 2, the payload channel 30 is an exemplary radio broadcast transmission. As indicated in FIG. 4B, the instantaneous bandwidth requirement varies based on the content segment. Musical selections 36 (e.g., segments "425", "007", "133", "083", "350" and "196") use significantly more bandwidth per content segment than "live" content segments 32 comprising dialogue. Prerecorded advertisements 34 generally use more instantaneous bandwidth than the "live" content segments 32 but less bandwidth than musical recordings 36. Thus, bandwidth efficiency can be increased if content segments such as musical recordings 36 can be stored at the receivers 14. The transmission bandwidth requirement to provide a musical recording to a user via a receiver 14 is therefore reduced, as evident from FIG. 4D, when a content segment index or identifier and progress data 42 is transmitted in lieu of the corresponding content segment, as shown in FIG. 4C.

Figure 5:
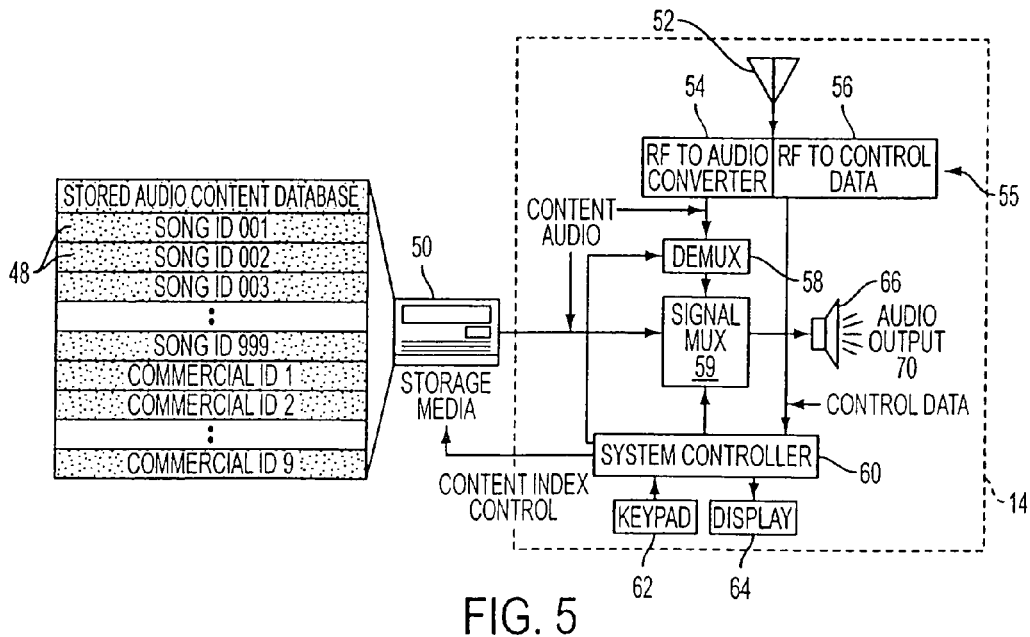
FIG. 5 is a block diagram of a receiver constructed in accordance with an embodiment of the present invention.

FIG. 5 illustrates an exemplary receiver 14 with a local storage device 50. The local storage device 50 can be any memory device that can store information in a digital format and can include, but is not limited to, a floppy disc, a hard disk, a compact disc (CD), a digital video disc (DVD), an optical disc, random access memory (RAM), a FLASH memory, a disk pack, digital audio tape (DAT), or other medium for storage and retrieval of digital information. The local storage device 50 can be provided within a receiver 14 chassis or connected externally thereto. Selected content segments 48 are stored in the local storage device, along with associated index information (e.g., unique identifiers).

With continued reference to FIG. 5, the receiver 14 comprises an antenna 52 for receiving a broadcast signal from at least one of the satellites 12 and 16 and/or a terrestrial repeater 17. As stated previously, the broadcast signal can originate from only a terrestrial transmission system. A converter 55 is preferably provided which is operable to perform radio frequency (RF) downconversion, and any demodulation, synchronization, demultiplexing, de-interleaving and decoding functions performed as part of the transport layer at a broadcast station in the system 10, and described in the aforementioned application Ser. No. 09/433,862, to obtain the baseband payload channels from the broadcast composite data stream. The receiver 14 comprises a controller 60 connected to a display 64 and keypad 62 to allow a user to select a payload channel, among other operations. In response to the user program channel selection, the controller 60 provides control signals to a demultiplexer 58 to select the corresponding payload channel for output via a loudspeaker 66 or other output device (e.g., a display or monitor).

The converter 55 comprises an RF-to-audio converter 54 and an RF-to-control data converter 56 to extract, respectively, the content segments 32 and the control data 42 from a selected payload channel 40 in the received signal. The content segments 32 are preferably provided to the output device 66 via a signal multiplexer 59 as soon as they are received and processed via the converter 55 and demultiplexer 58. The extracted control data 42 is provided to the controller 60 which generates control signals for the signal multiplexer 59 and the local storage device 50. The control signals provided to the local storage device 50 indicate which of the stored content segments 48 stored in the local storage device 50 are to be accessed and retrieved in accordance with the control data. The control signals provided to the signal multiplexer 59 from the controller 60 indicate when retrieved content segments are to be provided in the output signal in accordance with the current time index provided in the control data 42 for the corresponding retrieved content segment.

The content segments 48 stored in the local storage device 50 can be updated via any of a number of different methods. For example, a broadcast signal can be provided to the controller 60 for controlling the storage device 50 to delete selected content segments stored therein, to replace selected content segments with different segments transmitted in the broadcast signal, as well as to add new segments transmitted in the broadcast signal. Instructions for updating the storage device 50 and corresponding content segments can also be provided via an application provided on a portable storage device, or downloaded from a terrestrial communication network.

Although the present invention has been described with reference to a preferred embodiment thereof, it will be understood that the invention is not limited to the details thereof. Various modifications and substitutions will occur to those of ordinary skill in the art. All such substitutions are intended to be embraced within the scope of the invention as defined in the appended claims.

What is claimed is:

1. A method for generating an output signal at each of a plurality of receivers using a broadcast signal transmitted to the plurality of receivers in a digital broadcast system comprising the steps of:
    storing predefined content segments in a memory device associated with each of the plurality of receivers;
    receiving said broadcast signal at each of the plurality of receivers, said broadcast signal being transmitted to the plurality of receivers with segments of program content and segments of control data for reception by the plurality of receivers, said control data in the received broadcast signal comprising a list of selected said predefined content segments to be retrieved from said memory device in each of the plurality of receivers;
    accessing and retrieving selected said predefined content segments identified by said control data in the received broadcast signal from said memory device of at least some of the plurality of receivers; and
    playing back the selected said predefined content segments in said output signal in accordance with said control data in the received broadcast signal using at least some of the plurality of receivers;
    wherein said memory device at each of the plurality of receivers comprises index data with which to identify each of said predefined content segments stored therein, and said control data in the received broadcast signal comprises said index data corresponding to the list of selected said predefined content segments, said accessing step comprises the step of using said index data in said control data to retrieve said predefined content segments corresponding thereto from said memory device.

2. A method as claimed in claim 1, wherein said broadcast signal comprises content segment progress data for providing a time index for playing back one of said predefined content segments associated therewith, said playing back step comprising the steps of:
    playing back live broadcast content in said broadcast signal in substantially real-time in said output signal;
    extracting said index data and corresponding said content progress data in said broadcast signal as said broadcast signal is received; and
    inserting the selected said predefined content segments among said segments of program content using said index data and said content progress data to determine when the selected said predefined content segments are to be played back as said broadcast signal is received.

3. A method as claimed in claim 2, wherein playing back said output signal comprises the step of generating an audio output signal using said live broadcast data and inserting the selected said predefined content segments at selected intervals therein in accordance with said index data and said content progress data.

4. A method as claimed in claim 1, further comprising the step of updating said predefined content segments in said memory device.

5. A method as claimed in claim 4, wherein said updating step comprises the step of receiving broadcast content in said broadcast signal for updating said predefined content segments.

6. A method as claimed in claim 4, wherein said updating step comprises the step of retrieving program content stored on a portable storage medium to update said predefined content segments in said memory device.

7. A method as claimed in claim 1, wherein playing back comprises playing back the selected said predefined content segments in said output signal in an order provided by said control data in the received broadcast signal.

8. A method as claimed in claim 1, wherein the selected said predefined content segments are songs and said control data in the received broadcast signal instructs each of the plurality of receivers which songs to retrieve from said memory device and playback.

* * * * *